Sept. 14, 1937.  M. H. ROSENTHAL  2,092,932
KNOB MOUNTING
Filed June 10, 1936
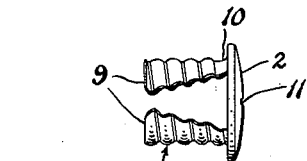
Fig. 1
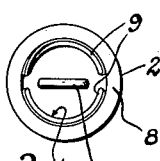
Fig. 3
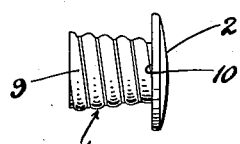
Fig. 2
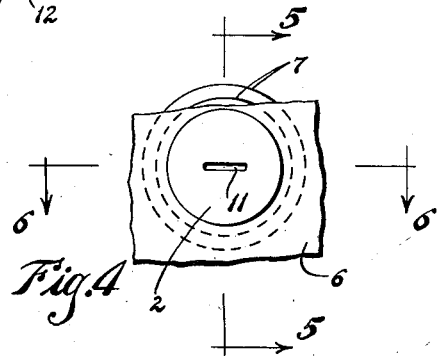
Fig. 4
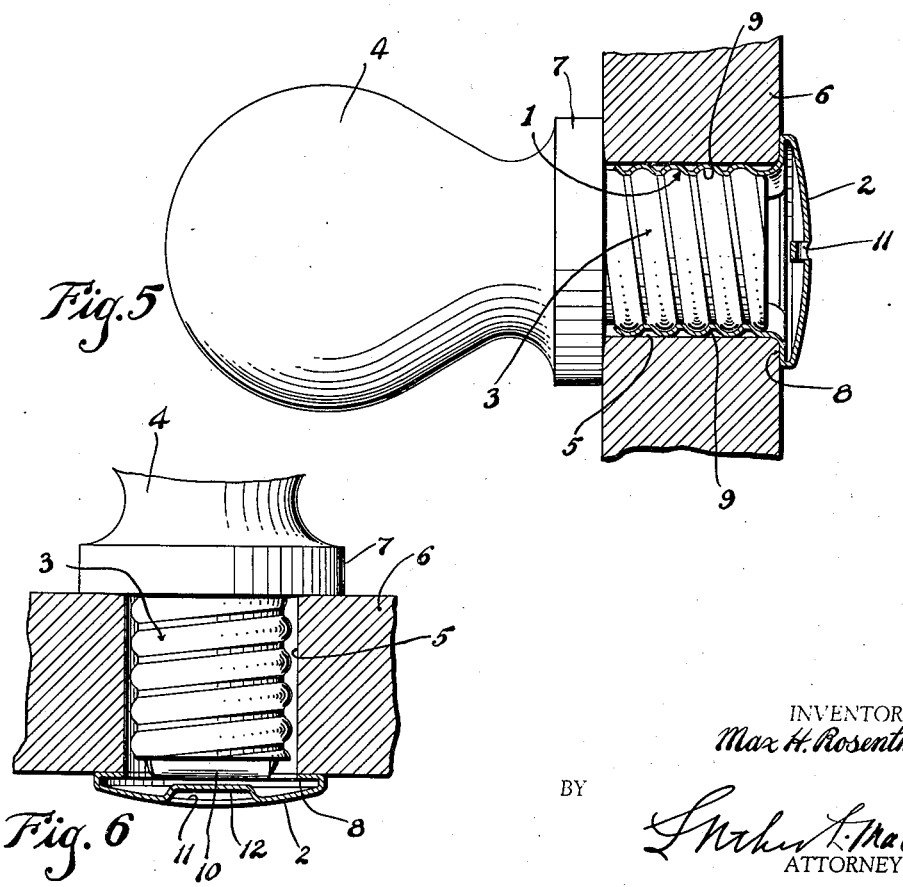
Fig. 5
Fig. 6
INVENTOR.
Max H. Rosenthal
BY
ATTORNEY.

Patented Sept. 14, 1937

2,092,932

UNITED STATES PATENT OFFICE 2,092,932

KNOB MOUNTING

Max H. Rosenthal, Los Angeles, Calif.

Application June 10, 1936, Serial No. 84,511

3 Claims. (Cl. 16—121)

This invention relates to and has for an object the provision of a comparatively simple, inexpensive and highly efficacious knob mounting primarily in the form of a one piece member which may be quickly and easily applied to securely, rigidly and removably attach knobs or pulls to drawers, doors and the like.

Another object is to provide a knob mounting means such as described which is particularly adapted for attaching glass knobs.

A further object is to provide a knob attaching member comprising a split and screw threaded bushing for cooperation with a threaded shank on the knob and having a head integral with one end of the bushing, which head facilitates application of the bushing and completely and neatly closes the hole formed in the drawer or the like for reception of the shank and said bushing, said split bushing being forced into close engagement with the wall of said opening upon screwing the bushing tightly upon said shank.

A still further object is to provide in a mounting means of the character described, a novel one piece construction which makes possible a divided or split bushing having the opposed portions thereof tapered and reduced in width toward the ends thereof which are formed integral with an annular back wall of the head, whereby said portions will be resilient and will be spread apart by the threaded shank of the knob and will fit tightly in the hole for receiving said shank and bushing.

Other objects may appear as the description progresses.

I have shown a preferred form of my invention in the accompanying drawing, subject to modification within the scope of the appended claims without departing from the spirit of my invention.

In said drawing:

Fig. 1 is a side elevation of the attaching member;

Fig. 2 is a top plan view of said member;

Fig. 3 is an end elevation of said member;

Fig. 4 is an end elevation of the member as when applied to a drawer or door;

Fig. 5 is a sectional view taken on line 5—5 of Fig. 4; and

Fig. 6 is a sectional view taken on line 6—6 of Fig. 4.

The embodiment of the invention shown in the accompanying drawing comprises a split screw threaded bushing 1 having a head 2 integral with one end thereof, said bushing being adapted to be screwed upon the threaded shank 3 of a knob 4, when the latter is applied to a drawer or door, by being inserted into an opening 5 which is formed through a wall 6 of a drawer or door, the head 2 overlying and closing said opening and the shoulder or flange 7 on the knob serving the same purpose as the head.

It is important to note that the bushing may be stamped from a single piece of metal. In cutting and forming this bushing the head 2 is made somewhat concavo-convex and provided with an annular inner wall or flange 8 integral with the periphery of the head, and disposed opposite and spaced from the concave side thereof. The bushing is in the form of a split barrel comprising two opposed complementary screw threaded arms or portions 9 which at certain ends are integral with said wall or flange 8. These portions 9 are curved in cross section and are tapered to comparatively narrow portions at 10 where joined to said wall or flange 8, whereby said portions will be somewhat resilient and therefore subject to being spread apart when the bushing is screwed upon the shank 3.

A screw driver groove 11 is provided in the head 2 by striking inwardly a portion 12 of said head.

It will now be seen that the knob, whether formed of glass or other material and having the threaded shank 3 either integral therewith or secured thereto, inserted into the opening 5 in a drawer or door to which it is to be attached, may be quickly secured in place by inserting the bushing 1 and screwing the same upon said shank with the shoulder or flange 7 and the bushing head 2 engaged with opposite sides of the wall or member 6 of said drawer or door. The shank 3 will extend laterally through the V-shaped openings provided between the opposed portions 9 of said bushing, as seen in Fig. 6, and will force said portions 9 into close fit with the wall of the opening 5 whereby to more rigidly fasten the knob in place, it being noted that the annular wall or flange 8 will engage said member 6 and that the head 2 will form a complete and neat closure for said opening.

What I desire to secure by Letters Patent and claim as my invention, is:

1. A knob having a screw threaded shank adapted to be inserted into an opening in a drawer to which the knob is to be attached, a longitudinally split screw threaded resilient sheet metal bushing threaded on said shank by the turning thereof relative to the shank, and a head closing an end of said bushing and covering said opening and having a screw driver receiving depression therein, said bushing comprising opposed portions each being gradually reduced in width toward said head and adapted to be forced outward against the wall of said opening throughout the length of said portions when said bushing is screwed upon said shank from the inside of the drawer.

2. In a knob mounting, a resilient sheet metal bushing which is screw threaded split longitudinally to define spaced opposed portions, a head closing an end of the bushing and having a screw driver receiving depression therein, and an annular member formed integral at its inner edge with said opposed portions and joined at its outer edge with the periphery of said head and being inwardly spaced from said head.

3. In a knob mounting, a screw threaded resilient sheet metal bushing being divided longitudinally to define spaced opposed members, a concavo-convex head of greater diameter than and closing an end of said bushing, and an annular member formed integral at its outer edge with certain ends of said opposed portions and joined at its inner edge with the periphery of said head and being spaced inwardly from and opposite to the concave side of said head, said annular member being adapted to engage the member to which said bushing is applied for securing a knob thereto, said opposed portions being gradually reduced in width toward said annular member, said head having a screw driver receiving depression therein.

MAX H. ROSENTHAL.